Feb. 25, 1969 JONG-DOK KIM 3,430,034

ARRANGEMENT FOR THE READING OF SHEET-SHAPED RECORD CARRIERS

Filed July 25, 1966

Sheet 1 of 2

INVENTOR
JONG-DOK KIM

BY Stiel & Stiel

ATTORNEYS

INVENTOR
JONG-DOK KIM

BY [signature]
ATTORNEYS

United States Patent Office 3,430,034
Patented Feb. 25, 1969

3,430,034
ARRANGEMENT FOR THE READING OF SHEET-SHAPED RECORD CARRIERS

Jong-Dok Kim, Munich, Germany, assignor to Siemens Aktiengesellschaft, a corporation of Germany Filed July 25, 1966, Ser. No. 567,678
Claims priority, application Germany, July 26, 1965, S 98,424
U.S. Cl. 235—61.11 4 Claims
Int. Cl. G06k 7/015; B65h 3/08

ABSTRACT OF THE DISCLOSURE

An arrangement for reading sheet-like record carriers of a record carrier stack where the record carrier on top of the stack is aspirated by a suction means having a recess or window to accommodate a reader unit. The suction means holds the record carrier in the proper location with respect to the reader while the information is being read.

Figure 1:
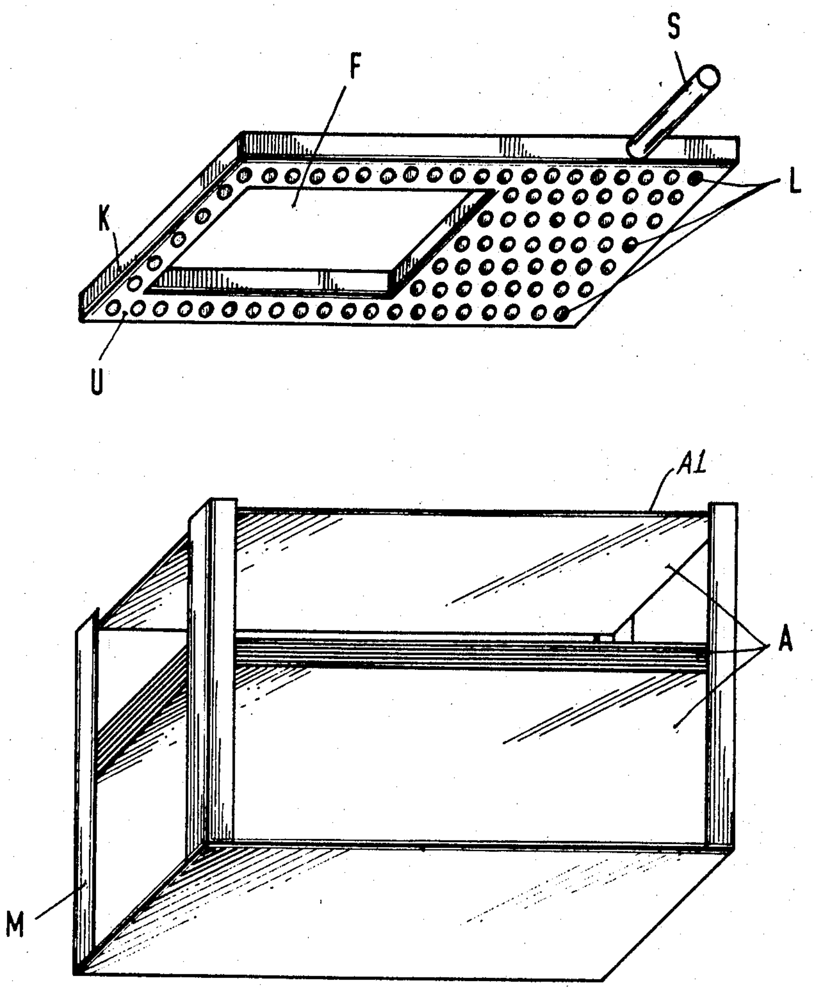

The invention relates to an arrangement for the reading of sheet-like record carriers which are utilized in sorting devices, and also for separating or printing operations. Arrangements are known for sorting sheet-like record carriers, which make use of the following principle. A stack or pile of record carriers to be sorted is located in a magazine, form which record carriers are removed by means of transport devices, ether at the upper side of the stack or at the lower side of the stack and directly into a transportation path. The sorting process takes place, for example, in such a way that the record carrier is braked, read and reaccelerated on the transportation path. Then, according to the nature of the particular data read, the reading device controls the direction of the record carrier into a certain filing compartment. In such filing compartment, the record carrier is braked a second time and filed. However, such arrangements possess different disadvantages, the most important disadvantage residing in the fact that the shocks of the transportation device are transmitted to the record carriers, thereby impairing the reading process.

According to the invention, this disadvantage is avoided by the feature that means are provided, forming a unitary structure with the reading device, which separates the respective record carriers, at least during the reading process, from the sorting mechanism and at least retains the information field of the record carrier in the operatively effective range of the reading device.

In an advantageous arrangement, the means may comprise a vacuum device which draws the record carrier by suction and which contains at least one open area of at least the size of the information field for reception of the reading device, closely to adjust a record carrier retained by the vacuum device.

Advantageously, in the example embodiment illustrated, the reading is effected directly following removal of the record carrier from the feed stack.

In addition to the advantage of achieving the reading without shocks, the arrangement according to the invention also has the advantage of a small compact structure, as the reading may be effected directly from the feed stack. Furthermore, an exact braking operation otherwise necessary for a position-exact reading, is not required which, in view of the sparing of the record carriers from the additional handling, and the resulting increase in the sorting speed, is an advantageous feature. A further advantage of the invention results from the use of a vacuum device which, in contrast to the customary devices, does not laterally draw the record carrier off, but lifts it off. As a result, an electrostatic charging of the record carriers is avoided, which contributes to perfect record carrier separation, transportation and filing operations.

Figure 2:
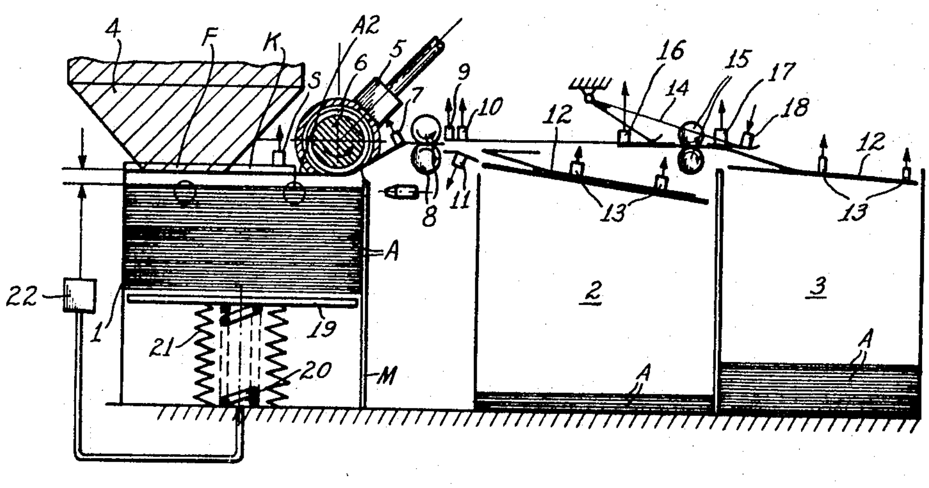

In the drawing, wherein like reference characters indicate like or corresponding parts:

FIG. 1 is an exploded view of a record carrier magazine and a vacuum chamber, according to the invention; and FIG. 2 is a schematic figure of a sorting machine embodying the invention.

FIG. 1 illustrates a vacuum chamber K which is provided with an opening or window F which is to receive a reading device 4, as illustrated in FIGURE 2. The bottom side of the vacuum chamber is provided with a number of openings L. The vacuum chamber is adapted to be connected to a vacuum producing device by means of the outlet fitting S attached to one side wall of the vacuum chamber. The low pressure existing at the interior of the chamber K draws the uppermost record carrier A1, by suction, closely to the bottom face U of the vacuum chamber. To enable a visual understanding, the distance of the uppermost record carrier from the bottom part U of the underpressure chamber has not been represented according to scale. Since the record carriers are stacked in a magazine M, it is arranged that the relative position of the window F in relation to the information fields located on the record carrier is always the same. Preferably, the vacuum chamber K is shorter than the record carrier, at least at one side, so that the means which transports the record carrier following conclusion of the reading process may be disposed adjacent to that portion of the record carrier not acted upon by the suction. Further constructive developments of the invention are conceivable, for example, an arrangement employing several windows F for use with divided information fields. Advantageously, the arrangement also includes a magazine with automatic leveling means which maintain a constant distance between the upper face of the stack and the bottom face of the vacuum chamber.

FIG. 2 illustrates the application of the invention to a machine, for example, a sorting machine wherein the record carrier A of a stack 1 may be read and deposited in either of several filing trays 2, 3 in accordance with such reading. In the example illustrated, the record carriers A are initially disposed in the stack 1 within the container M, such as illustrated in FIG. 1, suitably constructed to maintain the top sheet of the stack 1 at a predetermined elevation, which is illustrated as a distance from the bottom face U of the vacuum chamber K equal to the thickness of several record carriers A. Numerous nozzles or orifices for the withdrawal or discharge of air are utilized, the direction of air flow being indicated by arrows associated therewith. Thus the top sheet $A_2$ of the stack 1 is drawn upwardly by the vacuum chamber K, constructed as herein described and illustrated in FIG. 1, positioned thereabove. In this position a read-out-unit 4 in the reading window F is actuated to read out the information of the record carrier $A_2$ held by the suction on the bottom face U of the vacuum chamber K. Then a valve 5 on the suction drum or roller 6 is actuated, to connect a vacuum producing device with the permanently revolving suction drum 6 and to disconnect the vacuum producing device from the vacuum chamber K. An air withdrawal nozzle 7 is disposed at the opposite side of the suction drum 6 to raise the edge of the record carrier $A_2$ for engagement between two feed rollers 8, 8. Three air withdrawal nozzles 9, 10 and 11 are disposed at the discharge side of the rollers 8, 8, two being disposed above the transport path and one therebelow. The lattter nozzle 11 is operative to draw the leading edge portion of the record carrier A downwardly, whereby the carrier A may be deposited in the first tray 2, while the other two nozzles 9 and 10 are operative to maintain the leading edge portion of the carrier in elevated position for transport to the next tray 3. Both trays 2, 3 are provided with a respective brakeplate 12 and air withdrawal orifice 13. Associated with the second tray 3 is a suitable angle-shaped lever 14, additional feed rollers 15, 15, and respective air nozzles 16, 17 and 18 or orifices for controlling the movement of the record carrier A in accordance with the desired operation. By suitable control of the various air nozzles a record carrier A can be deposited in either tray, the carrier being effectively braked in suitable manner.

Stack raising means are provided to secure a constant distance between the uppermost carrier of the stack 1 and the bottom face U of the vacuum chamber K. The stack raising means includes a movable bottom 19 of the magazine M, a combination of a helical spring 20 and a flexible chamber 21 and a means 22. The combination is arranged under the bottom 19 with the flexible chamber 21 connected to the means 22 which detects distance between the top sheet of stack 1 and the bottom face U of the vacuum chamber K and controls the air pressure in the flexible chamber 21 to maintain the top sheet at the selected distance.

Changes may be made within the scope and spirit of the appended claims which define what is believed to be new and desired to have protected by Letters Patent.

I claim:

1. An arrangement for reading of sheet-like record carriers, and in particular in a sorting machine, comprising:

holding means being located adjacent to a stack of record carriers and being oriented to the top most carrier of said stack, said holding means including a vacuum device to draw the top most record carrier from said stack by suction to a reading position thereon, said vacuum device having an open area of a size corresponding to the field of information on said record carrier and being oriented thereto; and a reading device being disposed in said open area of said vacuum device so that said reading device is adjacent said field of information of said record carrier in said reading position.

2. An arrangement according to claim 1, wherein said vacuum device comprises means forming a vacuum chamber having a face disposed toward said stack, said face having openings through which air is drawn into said chamber, said means forming said chamber having an opening being separated from the interior of said vacuum chamber to define said open area of said vacuum device.

3. An arrangement according to claim 2, which further includes a conveying means disposed adjacent an edge of said vacuum chamber to remove the record carrier from said reading position upon the completion of the reading operation, said vacuum chamber having a size smaller than the size of said record carrier so that a portion of the record carrier extends beyond said chamber to be engaged by said conveying means.

4. An arrangement according to claim 2, which further includes means for operatively supporting said stack of record carriers.

References Cited

UNITED STATES PATENTS

| | | | |
|---|---|---|---|
| 2,994,740 | 8/1961 | Conkwright et al. | 178—6 |
| 2,799,499 | 7/1957 | Perry | 271—26 |

OTHER REFERENCES

Engineering News-Record, pp. 22–23, Mar. 30, 1967.

MAYNARD R. WILBUR, *Primary Examiner.*

S. SHEINBEIN, *Assistant Examiner.*

U.S. Cl X.R.

271—26